United States Patent [19]

Molnar

[11] Patent Number: 4,878,680
[45] Date of Patent: Nov. 7, 1989

[54] STROLLER CAR SEAT

[76] Inventor: Terrence O. Molnar, 35325 Marina, Sterling Heights, Mich. 48077

[21] Appl. No.: 203,900

[22] Filed: Jun. 8, 1988

[51] Int. Cl.⁴ .............................................. B62B 7/12
[52] U.S. Cl. ..................................... 280/30; 280/643; 280/648; 280/43.14; 297/130; 297/250
[58] Field of Search ............. 280/30, 43, 43.14, 43.17, 280/47.25, 47.38, 47.4, 642, 643, 648, 650, 655, 658, 47.371, 655.1, 47.315; 297/130, 131, 250, 254, 255

[56] References Cited

U.S. PATENT DOCUMENTS

| 1,189,515 | 7/1916 | Wallace | 280/643 |
| 2,470,040 | 5/1949 | Mackin et al. | 280/643 |
| 2,706,642 | 4/1955 | Yarnell | 280/643 |
| 3,041,081 | 6/1962 | Lott | 297/131 |
| 3,944,241 | 3/1976 | Epelbaum | 280/30 |
| 4,210,340 | 7/1980 | White | 280/43.17 |
| 4,537,414 | 8/1985 | Nusbaum | 280/47.37 R |
| 4,620,711 | 11/1986 | Dick | 280/30 |
| 4,632,409 | 12/1986 | Hall et al. | 280/643 X |
| 4,647,054 | 3/1987 | Chong | 280/30 |
| 4,679,804 | 7/1987 | Johnson | 280/30 |
| 4,685,688 | 8/1987 | Edwards | 280/30 |
| 4,762,331 | 8/1988 | Tucker et al. | 280/30 |

FOREIGN PATENT DOCUMENTS

| 140374 | 3/1953 | Australia | 280/642 |
| 2190335 | 11/1987 | United Kingdom | 280/43.17 |
| 2195299 | 4/1988 | United Kingdom | 280/30 |

Primary Examiner—Charles A. Marmor
Assistant Examiner—Brian L. Johnson
Attorney, Agent, or Firm—Leon Gilden

[57] ABSTRACT

A convertible car seat and stroller combination is set forth wherein the invention provides a car seat in a first position of a rearwardly oriented handle and a stroller when the handle is telescopingly extended from within supporting tubes to operate a cable arrangement to pivotally retract and extend associated wheel structure.

1 Claim, 1 Drawing Sheet

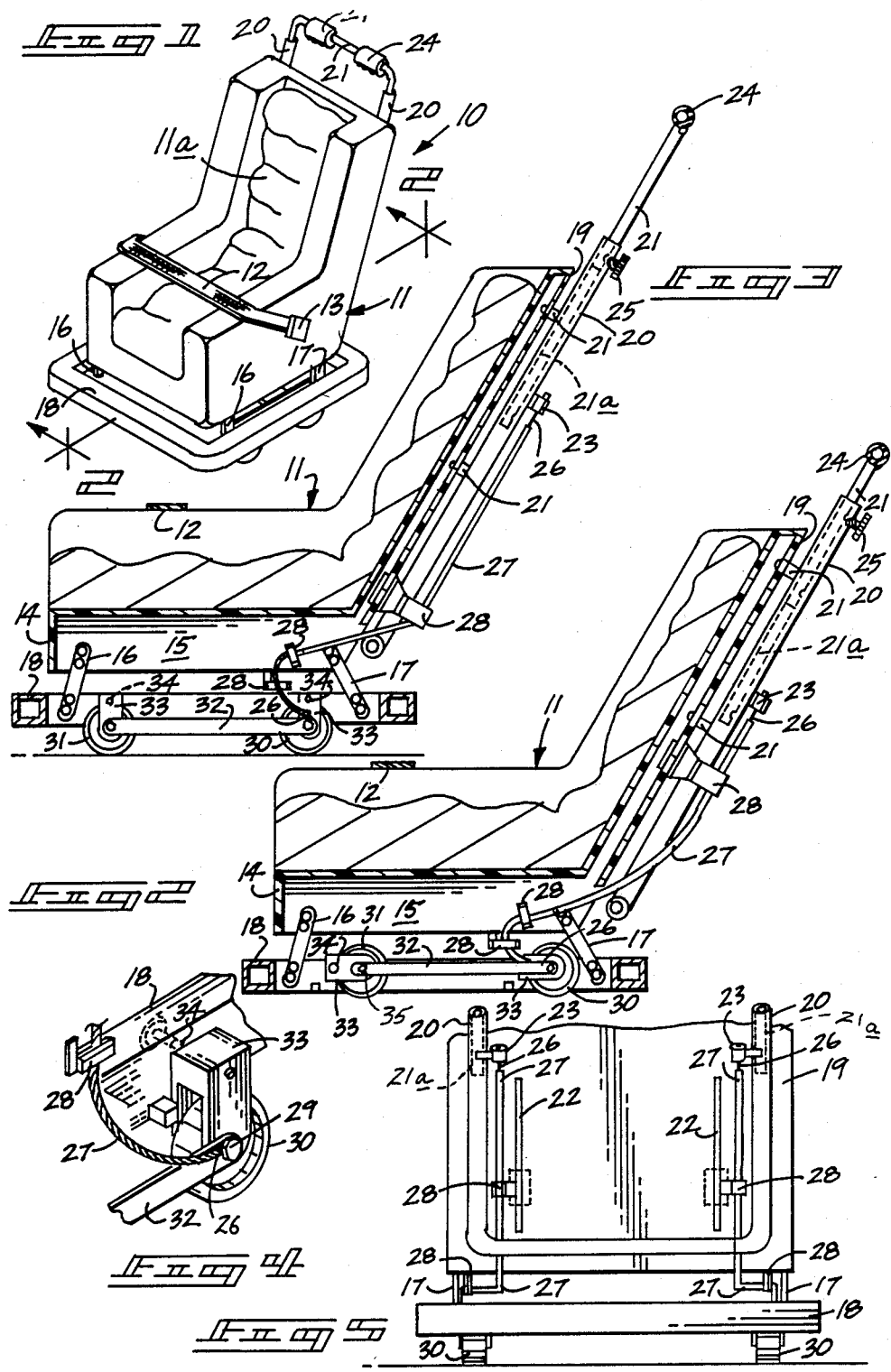

STROLLER CAR SEAT

BACKGROUND OF THE INVENTION

1. Field of the Invention

The field of invention relates to child-safety furniture, and more particularly pertains to a new and improved car seat stroller that is utilized as a car seat in a first configuration and a stroller in a second configuration for providing transport to an associated child.

2. Description of the Prior Art

The use of convertible children's safety apparatus is known in the prior art. As may be appreciated, these devices have normally required a substantial amount of interconnecting linkage and relatively complex configuration to effectively operate the devices in their various configurations of use. In this connection, there have been several attempts to develop convertible children's safety furniture which may be easily and efficiently manipulated between various configurations of use. For example, U.S. Pat. No. 2,470,040 to Mackin et al. sets forth a collapsible stroller wherein an associated linkage enables interfolding of the various link components of the stroller to enable ready transport thereof. The Mackin et al. patent is of interest relative to the use of linkage associated with a stroller arrangement to enable conversion from one geometric configuration to another.

U.S. Pat. No. 2,706,642 to Warnell Yarnell sets forth retractable wheel supports for use in combination with a baby carriage wherein a rotatable handle arrangement enables retraction of associated wheels of the baby carriage by associated fulcruming and spring arrangements.

U.S. Pat. No. 4,620,711 to Dick sets forth a car seat stroller wherein a handle is pivotal from a rearward position to a forward position to enable retraction of associated wheels for securement to an associated car seat. While of interest to the instant invention relative to the general concept of a convertible car seat stroller arrangement, the structure and functioning arrangement of the apparatus is relatively remote to that of the instant invention.

U.S. Pat. No. 4,647,054 to Chong provided with an associated retractable handle arrangement, but the handle arrangement does not provide any means for interlinking the retraction of wheels therewith and is of interest only relative to the general notion of a car seat stroller organization.

U.S. Pat. No. 4,679,804 to Johnson sets forth a further car seat stroller wherein a pivotally arranged handle organization is operative to form a handle and associated pivotally lockable wheels are set forth to extend to enable use of the stroller.

U.S. Pat. No. 4,685,688 to Edwards sets forth a car seat stroller wherein a telescopingly associated handle is independently operated relative to the stroller and associated wheels are also telescopingly arranged to enable use as a car seat and a stroller, but as in the aforenoted prior art, the Edwards patent is of a relatively complex association of interrelated elements to provide the car seat stroller organization sought, wherein the instant invention sets forth a simplified and effective organization that enhances use and effectiveness as a car seat stroller.

As such, it may be appreciated that there is a continuing need for a new and improved car seat stroller that sets forth ease of use and simplicity of construction wherein the instant invention substantially fulfills this need.

SUMMARY OF THE INVENTION

In view of the foregoing disadvantages inherent in the known types of stroller car seats now present in the prior art, the present invention provides an stroller car seat wherein the same may be compactly stored during periods of non-use and may be further easily and efficiently converted from a car seat configuration to a second stroller configuration, as desired. As such, the general purpose of the present invention, which will be described subsequently in greater detail, is to provide a new and improved stroller car seat which has all the advantages of the prior art convertible stroller car seats and none of the disadvantages.

To attain this, the present invention comprises a child conforming seat with an associated overlying safety belt secured to an underlying perimeter frame. The underlying perimeter frame has pivotally secured thereto plural pairs of stroller wheels that are retracted and operably secured to a telescopingly positioned handle formed rearwardly of the seat wherein upon extending the handle, the plural pairs of stroller wheels are extended for use.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved stroller car seat which has all the advantages of the prior art stroller car seats and none of the disadvantages.

It is another object of the present invention to provide a new and improved stroller car seat which may be easily and efficiently manufactured and marketed.

It is a further object of the present invention to provide a new and improved stroller car seat which is of a durable and reliable construction.

An even further object of the present invention is to provide a new and improved stroller car seat which is susceptible to a low cost of manufacture with regard to both materials and labor, and which accordingly is then susceptible to a low price of sale to the consuming public, thereby making such stroller car seat economically available to the buying public.

Still yet another object of the present invention is to provide a new and improved stroller car seat which provides in the apparatuses and methods of the prior art some of the advantages thereof, while simultaneously overcoming some of the disadvantages normally associated therewith.

Still another object of the present invention is to provide a new and improved stroller car seat which may be efficiently converted from a car seat arrangement to secure a child therein when transported by automobile and converted a stroller arranged when it is desired to withdraw the apparatus from the automobile and transport a child.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic illustration of the invention taken along the lines 2—2 of FIG. 1 in the direction indicated by the arrows.

FIG. 3 is an orthographic side view similar to Figure 2, but illustrating the stroller wheels in an extended position, as well as the associated handle.

FIG. 4 is a detailed isometric illustration taken in section of the associated cable secured to a stroller wheel.

FIG. 5 is a rear orthographic view of the instant invention.

DESCRIPTION OF THE PREFERRED EMBODIMENT

With reference now to the drawings, and in particular to FIGS. 1 to 5 thereof, a new and improved stroller car seat embodying the principles and concepts of the present invention and generally designated by the reference numeral 10 will be described.

More specifically, it will be noted that the stroller car seat apparatus 10 essentially comprises a conventional child's seat 11 formed with a padded interior 11a with an overlying safety belt 12 securable to a clasp mechanism 13. The seat 11 is formed with a downwardly depending flange 14, as illustrated in FIG. 2, that provides an interior surface 15. A forward plurality of securement brackets 16 cooperate with a rear plurality of rear securement brackets 17 depending downwardly from the interior surface 15 and secure thereby a perimeter frame 18 that extends outwardly of flange 14 and is underlying that flange.

A rear plate 19 is offset parallel to a rear upwardly extending exterior face of seat 11 and secures a pair of tubular supports 20 that extend upwardly above the upper perimeter of seat 11 that are parallel to each other and the rear plate 19. A "U" shaped handle 21 is telescopingly received within the tubular supports 20 with parallel downwardly depending legs 21a receivable within the respective tubular supports. The tubular supports are formed with an axially extending slot 22 that enables an integral clamp 23 that is integrally formed to each lower portion of leg 21a and therefore is movable with each leg 21a. A pair of padded cylindrical grips 24 are formed about the connecting leg of the "U" shaped handle 21 for cushioned use of the apparatus 10. Further, a threaded clamp 25 is threaded through each tubular support 20, as illustrated in FIGS. 2 and 3 and is impingeable upon each leg 21a to secure the "U" shaped handle 21 in a predetermined orientation relative to the tubular supports 20.

A flexible cable 26 is attached to each clamp 23. FIGS. 2 and 3 illustrate one side of the apparatus 10, but it may be appreciated that each side of the stroller car seat 10 is mechanically identical and for purposes of illustration, description of one side is deemed to be adequate.

The flexible actuator cable 26 is reciprocatably positioned within a fixed flexible conduit 27 that is clamped to the car seat stroller by a series of three clamps 28 with a first clamp secured to the rear plate 19, and a second and third clamp secured to the depending flange 14 to direct the flexible cable in securement to each rear wheel axle 29. Each rear wheel axle 29 supports a rear wheel 30 rotatably thereabout, and as illustrated in FIG. 4 for example, each bifurcated wheel support 33 is pivotally mounted to the perimeter frame 18 via pivot member 34 such that reciprocation of flexible actuated cable 26 positions and directs each rear wheel 30 from a first position to retract the wheels, as illustrated in FIG. 2, to a second extended position, as illustrated in FIG. 3 against abutment block 33a. An actuator link 32 is pivotally connected and formed to an outer end of each respective rear wheel axle 29 and forward wheel axle 35. In this manner, the forward wheels 31 will follow the rear wheels 30 in the predetermined arc of travel between a retracted and extended position, illustrated in FIGS. 2 and 3. It may be appreciated therefore that extension of the handle 21, as illustrated in FIG. 3, extends the forward and rear wheels 31 and 30 respectively and retraction of the handle 24 telescopingly within the tubular supports 20 will accordingly retract the wheels, as illustrated in FIG. 2.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A child stroller car seat apparatus comprising in combination, a frame including a back rest and a seat, and a downwardly depending flange directed orthogonally downwardly relative to said seat, and a perimeter frame underlying and outwardly directed from said flange and fixedly secured to said flange, and a first and second wheel pair;

each wheel pair pivotally secured to said perimeter frame, and each wheel pair including a rear and forward wheel;

a reciprocatably mounted handle which is reciprocatably mounted within a pair of tubular supports wherein said tubular supports are fixedly mounted rearwardly of said back seat and including actuator means mounted to each of said rear wheels from said handle, and said handle positioned rearwardly of said seat and movable from a first retracted position to retract said first and second wheel pairs relative to said perimeter frame, and movable to a second extended position to extend said first and second wheel pairs relative to said perimeter frame wherein said actuator means is operably connected between said handle and said rear wheels to effect said retracted and extended positions of said first and second wheel pairs, and wherein said actuator means comprises a plurality of flexible cables, a flexible cable connected between each axle of said rear wheels and said handle, and wherein said handle is of a generally "U" shaped configuration with a pair of parallel spaced downwardly depending legs each telescopingly and slidably received within one of said pair of parallel tubular supports, each of said tubular supports including a slot slidably receiving a clamp with each clamp integrally secured to each downwardly depending leg of said handle and each clamp securing a flexible cable thereto, and wherein an actuator link is secured between each of said rear and forward wheels, and wherein each forward and rear wheel includes a support axis and said actuator link is secured to each of said axles, and wherein each flexible cable is directed through a flexible conduit wherein said conduit is secured to said frame by a plurality of clamps to direct said conduit between each leg of said handle to each of said rear wheels, and further including abutment means secured to the perimeter frame for limiting extension of the first and second wheel pairs in the second position.

* * * * *